Jan. 8, 1924. 1,479,836
B. D. SAKLATWALLA ET AL
ELECTRIC MOTOR CONTROL
Original Filed April 24, 1919 2 Sheets-Sheet 1
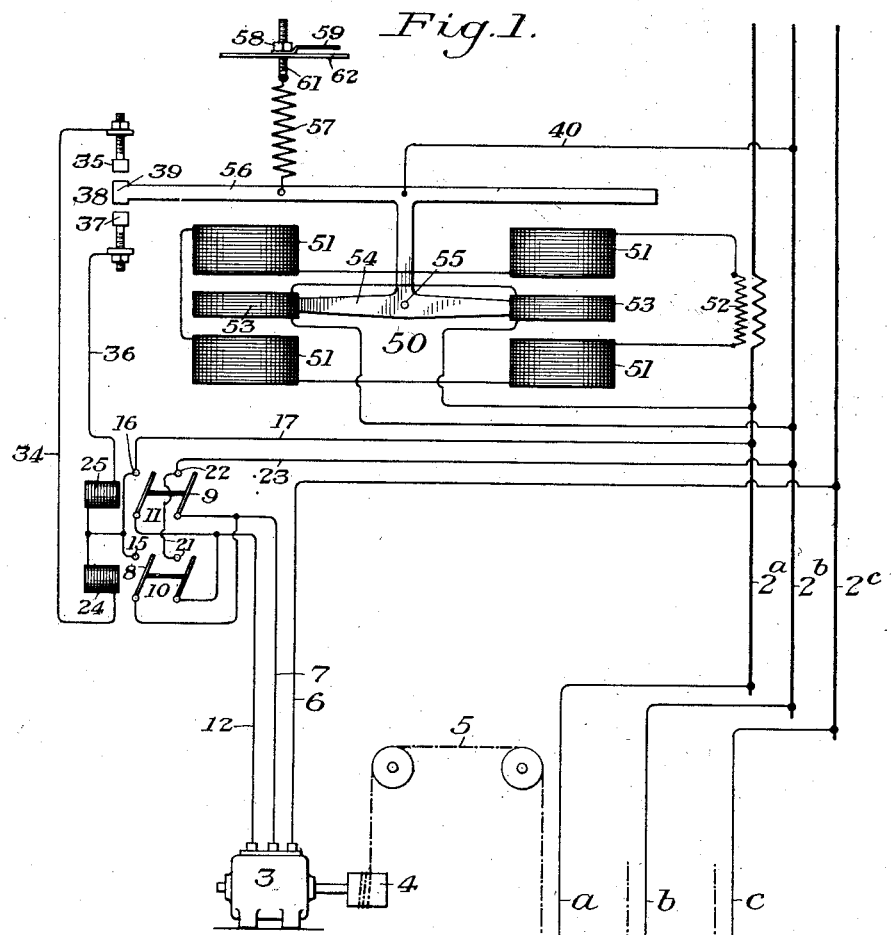
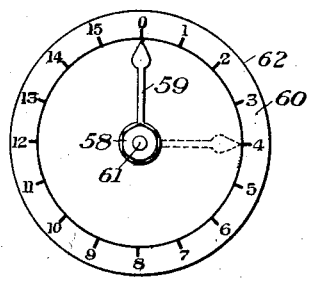
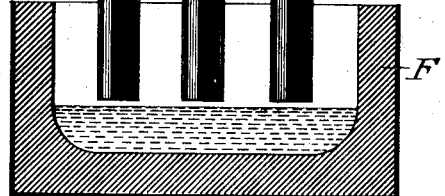

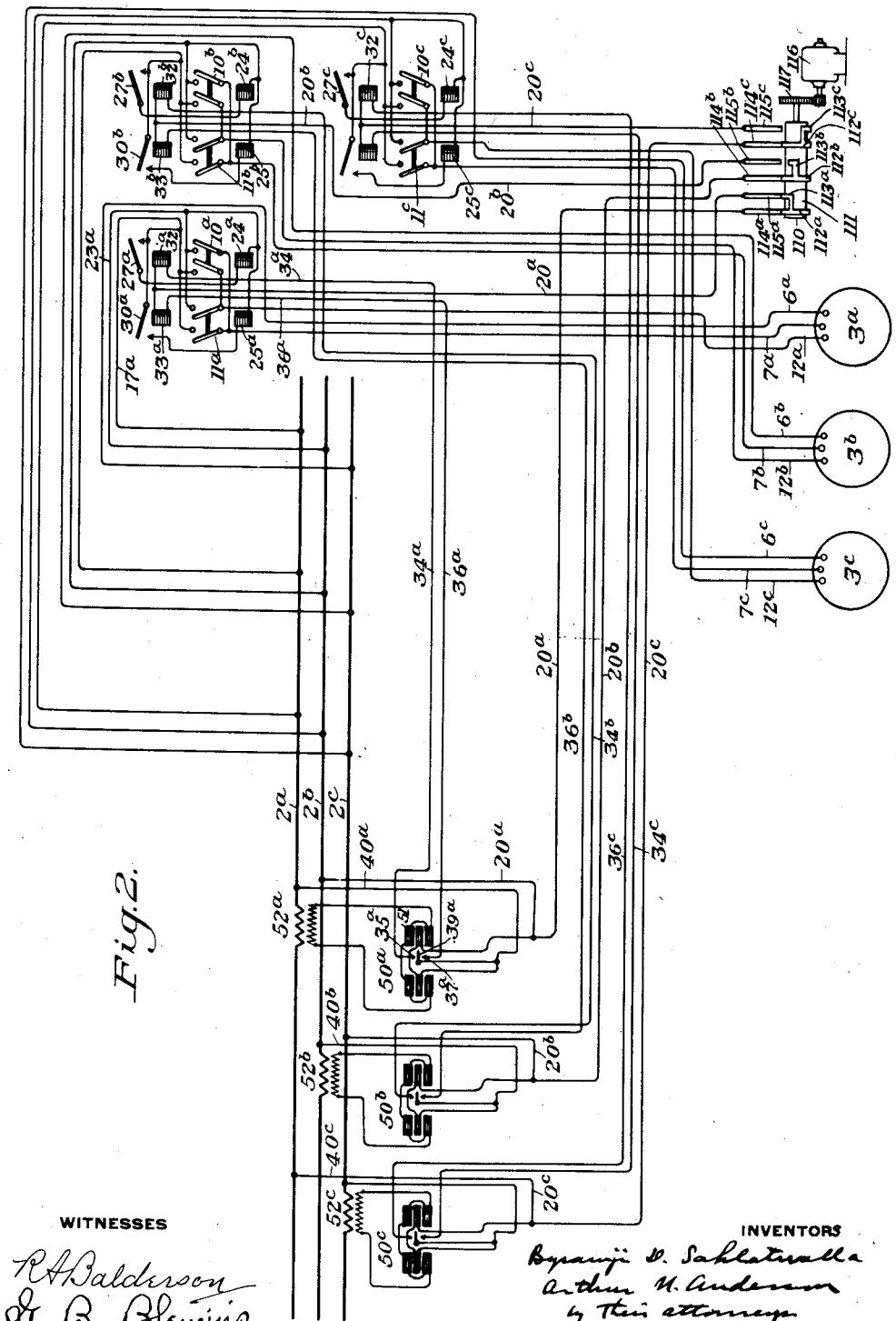

Patented Jan. 8, 1924.

1,479,836

UNITED STATES PATENT OFFICE.

BYRAMJI D. SAKLATWALLA AND ARTHUR N. ANDERSON, OF CRAFTON, PENNSYLVANIA, ASSIGNORS, BY MESNE ASSIGNMENTS, TO VANADIUM CORPORATION OF AMERICA, OF NEW YORK, N. Y., A CORPORATION OF DELAWARE.

ELECTRIC MOTOR CONTROL.

Application filed April 24, 1919, Serial No. 292,283. Renewed May 23, 1922. Serial No. 563,120.

*To all whom it may concern:*

Be it known that we, BYRAMJI D. SAKLATWALLA, a subject of the British Empire, residing at Crafton, in the county of Allegheny and State of Pennsylvania, and ARTHUR N. ANDERSON, a citizen of the United States, residing at Crafton, in the county of Allegheny and State of Pennsylvania, have invented a new and useful Improvement in Electric-Motor Controls, of which the following is a full, clear, and exact description, reference being had to the accompanying drawings, forming part of this specification, in which—

Figure 1 is a schematic view of an electric furnace regulating motor and its electrical connections.

Figure 1$^a$ is a detail view showing the adjusting dial of the Kelvin balance.

Figure 2 is a wiring diagram showing the motor control of the present invention as applied to the electrode regulating motors.

The present invention relates to an electric motor control, and more particularly to a control for preventing the motor from running past the position in which it is desired to have it stop. The present invention has been embodied in a control for the electric motors which regulate the position of the electrodes in an electric furnace and will be described with particular reference thereto, although it is to be understood that the motor control is not limited to such applications, but may be applied to electric motors used for any purpose.

Figure 1 is a schematic view showing the electric furnace and the means for regulating the position of the electrodes therein, such for example as that shown in our corresponding application Serial No. 292,286, for power control, filed of even date herewith. The furnace, indicated by reference character F is provided with three electrodes A, B and C which extend down into the furnace chamber in which are the materials to be smelted. The electrodes are connected by flexible leads $a$, $b$ and $c$ to bus bars $2^a$, $2^b$ and $2^c$ which are fed by a three-phase alternating current generator (not shown). In Figure 1 is illustrated the regulation for one electrode A, it being understood that a similar system is duplicated for the other two electrodes B and C. The electrode A is raised and lowered by means of a motor 3 having a drum 4 about which is wound a rope 5 from which the electrode A is suspended. One terminal of the motor is connected by a lead directly with the bus bar $2^c$. The second terminal of the motor is connected by a lead 7 with the blades 8 and 9 respectively of two single-throw double-pole switches 10 and 11. The third terminal of the motor is connected by a lead 12 with the other blades of the respective switches 10 and 11. The two stationary contacts 15 and 16 of the switches 10 and 11 are connected together and through a common lead 17 to the bus bar $2^a$. The other two stationary contacts 21 and 22 of these switches are connected together and through a common connection 23 to the bus bar $2^b$. The switches 10 and 11 are actuated by electric-magnets 24 and 25, respectively. The adjacent terminals of the magnets 24 and 25 are connected together and to the lead 17 from the bus bar $2^a$. The other terminal of the magnet 24 is connected through a lead 34 to the upper adjustable stationary contact 35 of a switch 38. The other terminal of the magnet 25 is connected through a lead 36 to the lower stationary contact 37 of this switch. The movable contact 39 of the switch 38 is carried on the end of an arm 56 which is actuated by a watt actuated device, indicated generally by reference numeral 50. A lead 40 connects the movable contact 39 through the arm 56 to the bus bar $2^b$.

The watt actuated device 50 is of the Kelvin balance type and comprises four stationary current-carrying coils 51 which are connected with a current transformer 52 in the bus bar $2^a$. The Kelvin balance has two potential coils 53 located between the current coils 51 and carried on the ends of a tiltable lever 54 pivoted at 55. The arm 56 is supported on the tiltable lever 54.

The coils are so wound that when current flows through the bus bar $2^a$, the left hand potential coil is attracted by the lower current coil and repulsed by the upper current coil; and the right hand potential coil is attracted by the upper current coil and repulsed by the lower current coil so as to force the arm 56 downward and bring the contact 39 against the stationary contact 37, as will be readily understood by one skilled in this art. The movement of the Kelvin balance under the magnetic action of these coils is resisted by a spring 57 connected with the arm 56 and hung from a threaded stud 61 movable through a stationary dial plate 62. The stud 61 may be raised and lowered to vary the tension of the spring 57 by means of a nut 58 carrying a pointer 59 which is movable over a dial scale 60.

The operation of the system so far described is to automatically maintain a constant wattage in the electric furnace, and thereby to maintain the energy of the furnace constant. The tension of the spring 57 is so adjusted with relation to the calibration of the dial scale 60 that the pointer 59 reads directly in kilowatts, and when the bus bar $2^a$ is delivering such kilowatts to the furnace, the contact 39 is suspended midway between the contacts 35 and 37. Suppose the dial pointer 59 to be set at the desired number of kilowatts. If for any reason, such as a lowering of resistance, the wattage increases beyond this point, the magnetic coils of the Kelvin balance 50 turn the arm 56 against the tension of the spring 57, bringing the movable contact 39 against the lower contact 37 and completing the electric circuit through the lead 40, the arm 56, the lead 36, the magnet 25 and the lead 17. The magnet 25 thereupon closes the switch 11 connecting the motor lead 7 through the lead 23 to the bus bar $2^b$, and the motor lead 12 through the lead 17 to the bus bar $2^a$. This connection is such that the motor 3 is driven in a direction to raise the electrode A, thus increasing the resistance of the arc and reducing the wattage. As soon as the wattage is reduced to that for which the dial is set, the Kelvin balance 50 resumes its neutral position and the motor should stop. Similarly, if the watts delivered to the electrode A fall below the predetermined setting of the dial, the spring 57 draws the arm 56 up, completing a circuit through the lead 40, the arm 56, upper contact 57, lead 34, magnet 25 and lead 17. This energizes the magnet 24, closing the switch 10 and connecting the motor terminal lead 7 to the bus bar $2^a$ through the lead 17, and the motor lead 12 to the bus bar $2^b$ through the lead 23. This is a reversal of the connections between the motor and the bus bars $2^a$ and $2^b$ which occurs when the switch 11 is closed. The motor 3 is therefore driven in the opposite direction to lower the electrode A, decreasing the resistance of the arc and increasing the current, and consequently the wattage, until the number of watts delivered is brought up to that for which the Kelvin balance is set, whereupon the motor 3 should stop.

It is found, however, that if the motor is connected as shown in Figure 1, it tends to run or drift past the position in which it should stop when the motor controlling switches are opened. To insure the stopping of the motor immediately upon the opening of the motor controlling switch, a motor stop drift is employed.

This motor stop drift consists of means for continuously and fairly rapidly making and breaking the feed circuit of the motor, so that the motor is operated intermittently, the recurring current impulses serving to intermittently drive the motor rotor. This serves to feed the electrode A up or down in a step by step movement. It prevents the motor rotor, pulley and associated parts from acquiring sufficient momentum to carry them materially beyond the position in which they are when the Kelvin balance serves to open the motor controlling switch upon the establishment in the furnace of the normal condition for which the Kelvin balance is set.

This stop drift device with the motors for controlling the three electrodes is shown in the wiring diagram of Figure 2. In Figure 2 the motors for regulating the positions of the three furnace electrodes are indicated by reference numerals $3^a$, $3^b$, and $3^c$. Each of the motors is controlled by a Kelvin balance, the respective balances being indicated at $50^a$, $50^b$ and $50^c$. The control of the motors is substantially the same as that indicated schematically in Figure 1, except that the magnets for the switches 10 and 11, which are indicated for the three motors as $10^a$ and $11^a$, $10^b$ and $11^b$, and $10^c$ and $11^c$, respectively are actuated through relays instead of directly from Kelvin balance.

Referring particularly to the connections for the motor $3^a$, the reference numerals for which correspond to those shown on Figure 1, but are used with the suffix "a": The switch $10^a$ when closed drives the motor in a direction to lower the electrode, while the switch $11^a$ when closed serves to reverse the connections and drive the motor in the direction to raise the electrode, the contacts for these switches being cross-connected and connected to the bus bars, substantially the same way as indicated in Figure 1. The switch $10^a$ is closed by a magnet $24^a$ and the switch $11^a$ is closed by a magnet $25^a$. The adjacent terminals of these two magnets are connected together and through the lead $23^a$ to the bus bar $2^b$. The other terminal of the magnet $24^a$ is connected through a switch $27^a$ to the lead $17^a$ going to the bus bar $2^a$. The other magnet $25^a$ has its other terminal connected through a switch $30^a$ to the lead $17^a$ going to the bus bar $2^a$. If the wattage drops, the Kelvin balance $2^a$ brings the movable contact $39^a$ against the upper stationary contact 35$^a$, completing the circuit through the wire 34$^a$ and energizing the magnet 32$^a$ to close the switch 27$^a$, whereupon the magnet 24$^a$ is energized, the switch 10$^a$ closed and the motor run in a direction to lower the electrode. Similarly if the wattage increases, the Kelvin balance causes the switch 11$^a$ to be closed to raise the electrode. The relay switches 27$^a$ and 30$^a$, shown in Figure 2, but not in Figure 1, are interposed in practice for the purpose of protecting the contacts of the Kelvin balance from arcing, and permit the Kelvin balance to be made of finer and more sensitive construction. When either of the motor feed switches 10$^a$ or 11$^a$ is closed, the motor is supplied with an interrupted driving current by means of the make and break device 110. The make and break device 110 comprises an insulating cylinder 111 having two conducting rings 112$^a$ and 113$^a$ which are in electrical contact with each other. The ring 112$^a$ is continuous but the ring 113$^a$ is interrupted. Bearing against the rings 112$^a$ and 113$^a$ are stationary contacts 114$^a$ and 115$^a$, which are interposed in the circuit 20$^a$. The insulating cylinder 111 is continuously rotated by means of an electric motor 116 through speed reducing gearing 117. The operation of this device is as follows:

Suppose the Kelvin balance 50$^a$ moves to bring the movable contact 39$^a$ against the lower stationary contact 37$^a$. This completes the circuit through the lead 40$^a$, lead 36$^a$, the relay magnet 33$^a$ and lead 20$^a$, which circuit extends between the bus bars 2$^a$ and 2$^b$. This closes the switch 11$^a$ to drive the motor 3$^a$ to raise the electrode. The circuit through the lead 20$^a$ is, however, being continuously interrupted by the make and break device 110. Consequently, as long as the Kelvin balance contact 39$^a$ is held against the lower contact 37$^a$ the relay magnet 33$^a$ will be energized intermittently, resulting in an intermittent closing of the switches 30$^a$ and 11$^a$. This feeds an intermittent current to the motor 3$^a$. The strength of the current and the length of the interrupted ring 113$^a$ of the make and break device are so proportioned that sufficient time elapses between the successive motor driving current impulses to permit the motor armature to become practically stationary between such impulses. The result is that the electrode is fed by small step by step movements, the motor coming to rest between each step. The motor, consequently, never acquires sufficient momentum to overrun subsequent steps, so that the electrode cannot be fed at most more than a fraction of a step after the Kelvin balance causes the switch 11$^a$ to be opened. The operation of the current interrupter is the same when the switch 10$^a$ is closed by the Kelvin balance to lower the electrode. The intermittent feeding of the current to the electrode regulating motor permits a strong energizing current to be used which insures a positive action of the motor, but at the same time prevents the motor from acquiring sufficient speed to overcome the desired stopping position.

The motors 3$^b$ and 3$^c$ are similarly regulated by Kelvin balances 50$^b$ and 50$^c$. The make and break cylinder 111 has two more sets of contact rings 112$^b$ and 113$^b$, and 112$^c$ and 113$^c$, corresponding to the rings 112$^a$ and 113$^a$, which make contact with stationary contacts 114$^b$ and 115$^b$, and 114$^c$ and 115$^c$ interposed in the leads 20$^b$ and 20$^c$, which correspond to the lead 20$^a$.

Another type of motor stop drift mechanism is described and claimed in our copending application for electric motor control (Case No. 2) Serial No. 292,284, filed of even date herewith.

While the device for preventing the motor from overrunning its desired stopping position, has been described particularly with reference to its application to motors for feeding the electrodes of an electric furnace, it is to be understood that the invention is not so limited, but may be employed in connection with motors for other purposes and in other structures, within the scope of the invention as defined in the appended claims.

We claim:

1. The combination with an electric arc furnace, of a motor for feeding an electrode, a relay in the motor feeding circuit, means for operating the relay in accordance with the furnace conditions for feeding the electrode in or out of the furnace, and means independent of the relay for causing the relay to interrupt the feed current to the motor whereby the electrode is fed by a step by step movement and prevented from being fed beyond its desired stopping position, substantially as described.

2. The combination with an electric arc furnace, of a motor for feeding an electrode, a relay in the motor feeding circuit, a circuit for operating the relay including a device operated in accordance with the furnace conditions for closing the circuit to the electrode feeding motor, and a current interrupter cooperating therewith so that the relay operates to continuously interrupt the feed current to the motor during the operation thereof, substantially as described.

3. The combination with an electric motor, of a feed circuit therefor, a relay in the feed circuit, means independent of the relay for intermittently closing the relay when it is desired to operate the motor comprising a relay controlling circuit and an interrupter in such circuit, substantially as described.

4. The combination with an electric arc furnace, of a motor for feeding an electrode, a relay in the motor-feeding circuit, means for operating the relay in accordance with the furnace conditions for feeding the electrode in or out of the furnace, and means operating independently of furnace conditions for causing the relay to interrupt the feed current to the motor whereby the electrode is fed by a step-by-step movement and prevented from being fed beyond its desired stopping position, substantially as described.

In testimony whereof, we have hereunto set our hands.

BYRAMJI D. SAKLATWALLA.
ARTHUR N. ANDERSON.